United States Patent
Varonen et al.

(10) Patent No.: US 12,537,313 B2
(45) Date of Patent: Jan. 27, 2026

(54) MODULAR ARCHITECTURE FOR FEEDING A PHASED ANTENNA ARRAY

(71) Applicant: TEKNOLOGIAN TUTKIMUSKESKUS VTT OY, Espoo (FI)

(72) Inventors: Mikko Varonen, Espoo (FI); Dristy Parveg, Espoo (FI); Pekka Rantakari, Espoo (FI); Antti Lamminen, Espoo (FI); Vladimir Ermolov, Espoo (FI); Jussi Säily, Espoo (FI); Timo Karttaavi, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 79 days.

(21) Appl. No.: 18/686,353

(22) PCT Filed: Aug. 25, 2022

(86) PCT No.: PCT/FI2022/050550
§ 371 (c)(1),
(2) Date: Feb. 23, 2024

(87) PCT Pub. No.: WO2023/031508
PCT Pub. Date: Mar. 9, 2023

(65) Prior Publication Data
US 2024/0405444 A1 Dec. 5, 2024

(30) Foreign Application Priority Data
Sep. 1, 2021 (FI) .................................... 20215912

(51) Int. Cl.
*H01Q 21/00* (2006.01)
*H01Q 3/36* (2006.01)
(Continued)

(52) U.S. Cl.
CPC ........... *H01Q 21/0025* (2013.01); *H01Q 3/36* (2013.01); *H01Q 1/2283* (2013.01); *H04B 7/0617* (2013.01)

(58) Field of Classification Search
CPC ........ H01Q 21/0025; H01Q 3/36; H01Q 3/26; H01Q 1/2283; H04B 7/0617; H04B 7/084
See application file for complete search history.

(56) References Cited

U.S. PATENT DOCUMENTS 9,960,883 B1 * 5/2018 Chakraborty ........ H03D 7/1458
2019/0312330 A1 10/2019 Madsen et al.
(Continued)

FOREIGN PATENT DOCUMENTS

EP        3843212 A1    6/2021
WO   2021130252 A1    7/2021

OTHER PUBLICATIONS

Gu, X, et al., "Packaging and Antenna Integration for Silicon-Based Millimeter-Wave Phased Arrays: 5G and Beyond", IEEE Journal of Microwaves, vol. 1, No. 1, Jan. 2021, pp. 123-134.
(Continued)

*Primary Examiner* — Seokjin Kim
(74) *Attorney, Agent, or Firm* — Robert P. Michal, Esq.; Rimon PC (57) ABSTRACT

The present invention relates to a modular architecture for transmitting and/or receiving radio frequency (RF) signals using a phased antenna array. A first portion of the RF signal is transmitted/received by a master IC (21) and a second portion of the RF signal is transmitted/received by a plurality of satellite ICs (22). RF distribution between the master IC (21) and the satellite ICs (22) occur over a low-RF-loss interposer (51). The master IC (21) performs upconversion/downconversion between RF signal and a baseband or intermediate frequency signal.

15 Claims, 7 Drawing Sheets

(51) Int. Cl.
    *H01Q 1/22*     (2006.01)
    *H04B 7/06*     (2006.01)

(56) References Cited

U.S. PATENT DOCUMENTS

2020/0335866 A1    10/2020  Wang
2021/0028797 A1     1/2021  Kim et al.
2023/0085064 A1*    3/2023  Shi ..................... H01Q 21/065
                                                          343/702

OTHER PUBLICATIONS

Finnish Patent and Registration Office, Search Report for FI 20215912, dated Mar. 24, 2022, 2 pages.
European Patent Office, International Search Report for PCT/FI2022/050550, mailed Nov. 4, 2022, 3 pages.
European Patent Office, Written Opinion of the International Searching Authority for PCT/FI2022/050550, mailed Nov. 4, 2022, 7 pages.
Kibaroglu, K., et al., "A Low-Cost Scalable 32-Element 28-GHz Phased Array Transceiver for 5G Communication Links Based on a 2 x 2 Beamformer Flip-Chip Unit Cell", IEEE Journal of Solid-State Circuits, vol. 53, No. 5, May 2018, pp. 1260-1274.
Valdes-Garcia, A., et al., "Scaling Millimeter-wave Phased Arrays: Challenges and Solutions (Invited)", IEEE Xplore, downloaded Apr. 27, 2021, pp. 80-84.
Varonen, M., et al., "Receive and Transmit Beamforming SiGe BiCMOS ICs for Scalable E-Band Phased Arrays", VTT Technical Research Centre of Finland Ltd.

* cited by examiner

Prior art

MODULAR ARCHITECTURE FOR FEEDING A PHASED ANTENNA ARRAY

CROSS-REFERENCE TO RELATED APPLICATIONS

The present application is a U.S. national stage application of International Application No. PCT/FI2022/050550, filed Aug. 25, 2022, which claims priority to and the benefit of Finnish Application No. 20215912, filed Sep. 1, 2021, the contents of which are incorporated herein by reference and made a part hereof.

FIELD

The present invention relates to an apparatus and a method product related to phased antenna arrays. More particularly, the present invention relates to a modular architecture of a circuitry for feeding a phased antenna array.

BACKGROUND

Distribution of signals towards the beamforming integrated circuits (ICs) that feed antenna elements is one key challenge in phased antenna arrays, which may comprise hundreds, even over thousand antenna elements. Routing RF signals on printed circuit board (PCB) is challenging especially at higher frequencies, at which typical PCB materials become lossy. On the other hand, using baseband (BB) signal for distribution makes signal routing on PCB easier, but causes beamforming ICs to be more complex, requiring larger ICs and thus also becoming more expensive.

DESCRIPTION OF THE RELATED ART

Figure 1:
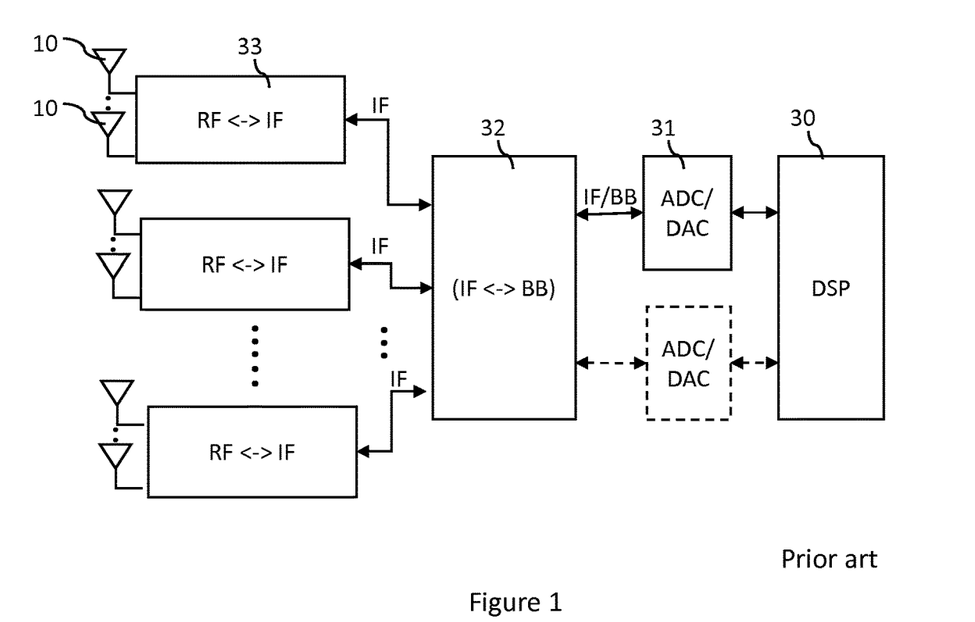
FIG. 1 illustrates a prior art architecture for feeding a phased antenna array.

Article "Scaling Millimeter-wave Phased Arrays: Challenges and Solutions", by Valdes-Garcia A. et. al., published In: 2018 IEEE BICMOS and Compound Semiconductor Integrated Circuits and Technology Symposium (BCICTS) 2018 Nov. 29, discloses three different approaches for phased array scaling with different functional partitions. Integrated circuits (ICs) that perform beam forming for the phased antenna array receive either radio frequency (RF) signals, baseband signals (BB) or intermediate frequency (IF) signals. This article proposes a compromise between the two extremes of RF and BB based signal distribution by performing beamforming and frequency conversion up to an IF frequency and distributing the IF frequency to the beamforming IC's that implementing RF to IF conversion before performing beamforming. The proposed architecture is illustrated in the FIG. 1. In this drawing, two-headed arrows between boxes illustrate connections between ICs comprising integrated circuitry preforming respective functions for transmission or reception. A digital connection is provided between the digital signal processor, DSP, (30) and a digital-to-analog converter, DAC (31), for transmitting operation and between the DSP and an analog-to-digital converter, ADC (31), for receiving operation. On the left of the ADC/DAC (31), the signal is either at a baseband (BB) frequency or at an intermediate frequency (IF). If the signal between the ADC/DAC (31) and an IF circuitry (32) is in BB, the IF circuitry (32) performs up- and/or down-conversion between BB and IF, and thereafter it performs IF beamforming operation. If the signal between the ADC/DAC (31) and an IF circuitry (32) is in IF, only IF beamforming is performed by the IF circuitry (32). Between beamformers (33) and the IF circuitry (32), signals are connected as IF signals. Each of the beamformers (33) perform IF to RF frequency conversion as well as RF beamforming for transmission via a plurality of antenna elements (10). Each of the beamformers (33) perform RF to IF frequency conversion for reception operation.

Such compromised solution solves the routing problem, but still has challenges in cost, signal routing and complexity. In the above referred prior art document, the unit ICs support N antenna elements and only perform RF beamforming options requiring RF routing to the subsequent level which is challenging at higher frequencies or the RF beamformer ICs include also the IF to RF conversion or IF to baseband conversion which increase complexity, cost and power consumption of the RF beamformer ICs. In the prior art solution, the BB or IF to RF conversion is done on a sub-module level of an antenna array in order to provide enough power for the beamforming submodules and beamforming satellite ICs while still minimizing the number of BB or IF to RF converting ICs in a large array. The proposed solution is thus a hybrid approach in which the BB or IF to RF conversion IC with submodules and beamforming satellite ICs together form a scalable antenna array module.

SUMMARY

An object is to provide a method and apparatus so as to solve the problem of providing feeding signals to or from a large phased antenna array. The objects of the present invention are achieved with a modular transmitter apparatus according to the claim 1 and with a modular receiver apparatus according to the claim 6. The objects of the present invention are further achieved with a method of transmitting signals according to the claim 11 and a method of receiving signals according to the claim 12.

The preferred embodiments of the invention are disclosed in the dependent claims.

According to a first transmitting aspect, a modular beamforming architecture for transmitting signals via a phased antenna array is provided. The phased antenna array comprising a plurality of antenna elements that is grouped into a first portion of antenna elements and a second portion of antenna elements. The modular beamforming architecture is based on a beamforming module comprising a master integrated circuit, IC and a plurality of satellite ICs.

The master IC is configured to receive a low frequency signal, wherein the low frequency signal is any one of an intermediate frequency signal and a baseband signal. The master IC comprises i) a frequency conversion module configured to upconvert the low frequency signal into a radio frequency, RF, signal comprising a first portion of the RF signal and a second portion of the RF signal, ii) a plurality of beamforming submodules configured to perform phase shifting for the first portion of the RF signal for beamforming and to feed the first portion of the RF signal to the first portion of antenna elements, iii) at least one RF signal output configured to output the RF signal or the second portion of the RF signal. When the at least one RF signal output is configured to output the RF signal, the master IC further comprises a plurality of RF inputs for receiving the first portion of the RF signal.

The plurality of satellite ICs are configured to feed the second portion of the antenna elements. Each of the plurality of satellite ICs is configured to receive a part of the RF signal or a part of the second portion of the RF signal provided by the at least one RF signal output of the master IC, to perform phase shifting to the received part of the RF signal or the second portion of the RF signal for beamforming, and to feed a subset of the second portion of antenna elements.

According to a second aspect of the transmitting architecture, each of the beamforming submodules of the master IC is configured to feed a number of antenna elements among the first portion of antenna elements that is equal to a number of antenna elements of the subset of the second portion of antenna elements fed by one of the satellite ICs.

According to a third aspect, the master IC is configured to receive a local oscillator signal and the master IC comprises a multiplier that multiplies the local oscillator signal by an integer, and wherein the frequency conversion module is configured to upconvert the low frequency signal into the RF signal using said multiplied local oscillator signal.

According to a fourth aspect of the transmitting architecture, the second portion of the RF signal is divided into a plurality of parts by at least one of the master IC and a plurality of power splitters along a signal distribution path between the master IC and satellite ICs, wherein each part of the second portion of the RF signal is fed into one of the plurality of satellite ICs, or the RF signal is divided into a plurality of parts by at least one of the master IC and a plurality of power splitters along a signal distribution path between the master IC and satellite ICs, wherein each part of the RF signal is fed into one of the plurality of satellite ICs or into one of the beamforming submodules.

According to a fifth aspect of the transmitting architecture, the RF signal is distributed to the satellite ICs and to the beamforming submodules via a low-loss interposer, or the first portion of the RF signal is distributed to the beamforming submodules within the master IC and the second portion of the RF signal is distributed to the satellite ICs via a low-loss interposer, and/or the low frequency signal is distributed to the master IC via a printed circuit board (PCB), and/or when according to the fourth aspect of the transmitting architecture, the local oscillator signal is distributed to the master IC via the PCB.

According to a first aspect of a receiving architecture, a modular beamforming architecture for receiving signals via a phased antenna array is provided. The phased antenna array comprising a plurality of antenna elements grouped into a first portion of antenna elements and a second portion of antenna elements. The modular beamforming architecture is based on a beamforming module comprising a master integrated circuit, IC, and a plurality of satellite ICs. The master IC is configured to produce a low frequency signal based on a received radio frequency, RF, signal comprising a first portion of the RF signal and a second portion of the RF signal. The low frequency signal comprises any one of an intermediate signal and a baseband signal. The master IC comprises i) a plurality of beamforming submodules configured to perform phase shifting for beamforming for the first portion of the RF signal received by the first portion of antenna elements, for obtaining the first portion of the RF signal, ii) at least one RF signal input configured to receive the second portion of the RF signal or the RF signal, iii) a frequency conversion module configured to down convert the RF signal into the low frequency signal, and iv) when the at least one RF signal input is configured to receive the RF signal, the master IC further comprises plurality of RF outputs for outputting the first portion of the RF signal received by the plurality of beamforming submodules.

The plurality of satellite ICs is configured to perform phase shifting for beamforming to the second portion of the RF signal received by the second portion of antenna elements. Each of the plurality of satellite ICs is configured to receive a part of the second portion of the RF signal that is received by a subset of the second portion of antenna elements, to perform phase shifting for beam forming to the respective part of the second portion of the RF signal, and to feed the respective part of the second portion of the RF signal towards one of the at least one RF signal input of the master IC.

According to a second aspect of the receiving architecture, each of the beamforming submodules of the master IC is configured to serve a number of antenna elements among the first portion of antenna elements that is equal to a number of antenna elements of the subset of the second portion of antenna elements served by one of the satellite ICs.

According to a third aspect of the receiving architecture, the master IC is configured to receive a local oscillator signal and the master IC comprises a multiplier that multiplies the local oscillator signal by an integer, and wherein the frequency conversion module is configured to down-convert the RF signal into the low frequency signal using said multiplied local oscillator signal.

According to a fourth aspect of the receiving architecture, a plurality of parts of the second portion of the RF signal is combined into the second portion of the RF signal by at least one of the master IC and a plurality of power combiners along a signal distribution path between satellite ICs and the master IC, or the plurality of parts of the RF signal is combined into the RF signal by at least one of the master IC and a plurality of power combiners along a signal distribution path between satellite ICs and the plurality of beamforming submodules and the master IC, wherein each part of the RF signal is provided by one of the plurality of satellite ICs or by one of the beamforming submodules.

According to a fifth aspect of the receiving architecture, the RF signal is distributed from the satellite ICs and from the beamforming submodules via a low-loss interposer, or the first portion of the RF signal is distributed from the beamforming submodules within the master IC and the second portion of the RF signal is distributed from the satellite ICs via a low-loss interposer, and/or the low frequency signal is distributed to the master IC via a printed circuit board (PCB), and/or when dependent on the third aspect of the receiving architecture, the local oscillator signal is distributed to the master IC via the PCB.

According to a transmitting method aspect, a method for transmitting signals via a phased antenna array using a modular beamforming architecture is provided. The phased antenna array comprises a plurality of antenna elements that is grouped into a first portion of antenna elements and a second portion of antenna elements. The modular beamforming architecture is based on a beamforming module comprising a master IC and a plurality of satellite ICs.

The master IC receives a low frequency signal, wherein the low frequency signal is any one of an intermediate frequency signal and a baseband signal, upconverts the low frequency signal into a radio frequency, RF, signal comprising a first portion of the RF signal and a second portion of the RF signal, comprises a plurality of beamforming submodules for performing phase shifting for the first portion of the RF signal for beamforming and to feed the first portion of the RF signal to the first portion of antenna elements, and outputs the RF signal or the second portion of the RF signal. When the master IC is outputs the RF signal, the master IC comprises a plurality of RF inputs for receiving the first portion of the RF signal for said beamforming submodules.

The plurality of satellite ICs feeds the second portion of the antenna elements. wherein each of the plurality of satellite ICs receives a part of the RF signal or a part of the second portion of the RF signal output by the master IC, performs phase shifting to the received part of the RF signal or the second portion of the RF signal for beamforming, and feeds a subset of the second portion of antenna elements.

According to a receiving method aspect, a method for receiving signals via a phased antenna array using a modular beamforming architecture is provided. The phased antenna array comprises a plurality of antenna elements grouped into a first portion of antenna elements and a second portion of antenna elements. The modular beamforming architecture is based on a beamforming module comprising a master IC and a plurality of satellite ICs. The master IC produces a low frequency signal based on a received radio frequency, RF, signal comprising a first portion of the RF signal and a second portion of the RF signal, wherein the low frequency signal comprises any one of an intermediate frequency, IF, signal and a baseband, BB, signal, comprises a plurality of beamforming submodules for performing phase shifting for beamforming for the first portion of the RF signal received by the first portion of antenna elements, receives the second portion of the RF signal or the RF signal, and down converts the RF signal to produce the low frequency signal. When the master IC receives the RF signal, the master IC comprises a plurality of RF outputs for outputting the first portion of the RF signal from said beamforming submodules.

The plurality of satellite ICs perform phase shifting for beamforming to the second portion of the RF signal received the second portion of antenna elements, wherein each of the plurality of satellite ICs, receives a part of the second portion of the RF signal that is received by a subset of the second portion of antenna elements, performs phase shifting for beam forming to the respective part of the second portion of the RF signal, and feeds the respective part of the second portion of the RF signal towards one of the at least one RF signal input of the master IC.

The present invention is based on the idea of a scalable, modular architecture comprising a number of mutually similar modules. Each module is implemented by coupling an intermediate frequency (IF) or baseband (BB) signal to a master IC, which performs signal up-conversion from IF to radio frequency (RF) for uplink signal in the module, and/or down-conversion from RF to IF or RF to BB for downlink signal. The master IC itself comprises a plurality of beamforming submodules for feeding antenna elements, and the master IC additionally feeds a plurality of separate satellite ICs comprised in the same module. RF signals between the master IC and the satellite ICs are preferably distributed over a low-loss interposer. RF signals for the beamforming submodules are distributed over the low-loss interposer or within the master IC itself. Preferably, the master IC comprising beamforming submodules and satellite ICs are implemented as monolithic microwave integrated circuits, MMICs.

The present invention has the advantage that it enables modular scaling of the phased antenna array, makes distribution of signals easier and further optimizes use of IC area, which reduces manufacturing costs. Number of low frequency to RF conversions or RF to low frequency conversions are minimized while size of a sub-array of antenna elements served by a module can be maximized using low-loss interposer for RF signal distribution. Separation of RF signal distribution from low frequency signal distribution on different distribution media also facilitates efficient heat management.

In this context, low frequency refers to signals in frequency range that is below RF frequencies. For example, baseband and/or intermediate frequency signals are examples of low frequency signals that also carry data to be transmitted or data that is received. Also, a local oscillator signal may be considered as a low frequency signal, when its frequency is below RF band.

An exemplary implementation is disclosed in which low frequency signals are routed on a printed circuit board (PCB), while a low RF-loss interposer is used for distributing RF signals between the master IC and the plurality of RF beamforming satellite ICs.

BRIEF DESCRIPTION OF THE DRAWINGS

In the following the invention will be described in greater detail, in connection with preferred embodiments, with reference to the attached drawings, in which.

DETAILED DESCRIPTION

As understood by a skilled person, the term serving an antenna element refers to both feeding antenna elements for transmission operation and receiving signals from antenna elements for reception operation and the term distributing refers both to dispersing a signal while splitting the signal from one to many signal portions carrying the same information but a portion of the power and to compiling a signal by combining many signal portions carrying the same information into a single, combined signal.

In the following description, RF signals in plural refer to portions of the same RF signal that is received or transmitted by the module and processed by respective portions of the circuitry for performing the reception or transmission using beamforming by the beamforming submodules and satellite ICs serving the phased antenna array.

Figure 2:
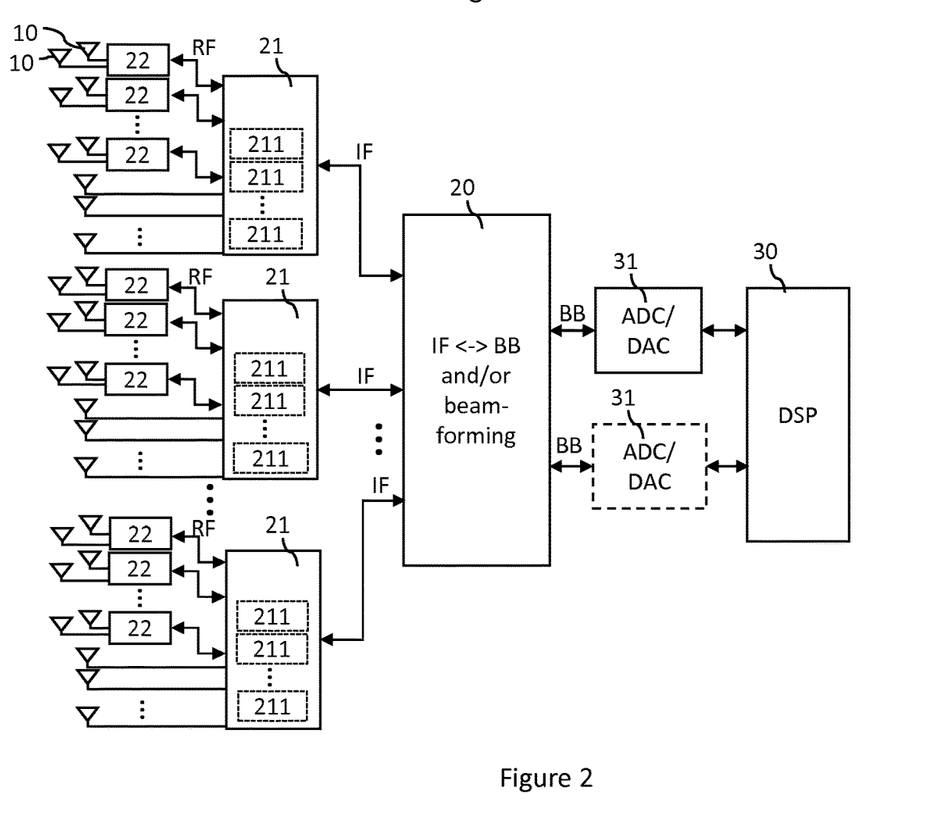
FIG. 2 illustrates a first embodiment of an architecture for feeding a phased antenna array.

FIG. 2 illustrates a modular architecture for serving a phased antenna array according to an embodiment of the invention. The same architecture principle is applicable to both transmission and reception operation. Various functional elements (30, 31, 20, 21, 22), which will be explained below are typically implemented as separate integrated circuits, which may be referred to as "chips" or "ICs". Double-ended arrows between these functional elements (30, 31, 20, 21, 22) illustrate signal connections. As understood by a skilled person, in transmission operation the signals proceed from digital signal processing by the DSP (30) on the right towards higher frequencies, finally to be transmitted by the antenna elements (10) on the left, while in reception operation, RF signals received by the antenna elements (10) on the left are processed and transported via the functional elements in the direction from the RF domain via IF domain and BB domain and finally to digital signal processing by the DSP (30) on the right.

One or more DSPs (30) perform digital signal processing and the digital signal is converted into an analog baseband signal by one or more DACs (31) or the arriving analog baseband signal is converted into a digital signal for the DSP (30) by one or more ADCs (31). As known in the art, number of ADCs/DACs is a design option.

The master IC (21) and satellite ICs (22) coupled to it form one module of the modular architecture. BB and IF signals can be distributed over a lossy distribution media such as standard printed circuit board, while RF signals between the master IC (21) and the satellite ICs (22) are preferably distributed over a low-loss media, which may be implemented for example by a low-RF-loss interposer. Since few signals need to be distributed over the lossy distribution media, routing is easy. No problematic RF signals, requiring strict design rules, need to be routed on the lossy distribution media. The modular structure further enables keeping number of RF distribution connections relatively low, while also length of the RF distribution connections can be maintained short. Examples of suitable materials for the low-RF-loss interposer are glass, low temperature co-fired ceramic (LTCC) and printed circuit board (PCB). PCB is preferable for mass production. Suitable PCB materials for millimeter wave applications are, for example, Isola Astra MT77™ and Panasonic Megtron 7N™.

When the master ICs (21) is designed to receive or produce an IF signal, BB to IF conversion for transmission and/or IF to BB conversion for reception are preferably performed by a frequency converter (20), and an off-chip IF connection is provided between the frequency converter (20) and each of a plurality of master ICs (21). The frequency converter (20) may also be configured to perform IF beamforming. Master ICs (21) perform an IF to RF conversion for transmission and/or an RF to IF conversion for reception. Each master IC (21) comprises a plurality of beamforming submodules (211), which perform phase shifting for beamforming, each beamforming submodule (211) directly serving a plurality of antenna elements (10). RF signals for the beamforming submodules (211) are distributed via the low-loss interposer, or alternatively within the master IC (21) itself. The master IC (21) comprises a plurality of RF signal outputs and/or inputs, which enable distributing RF-signals between the master IC (21) and a plurality of satellite IC's (22) and between the master IC (21) and the plurality of beamforming submodules (211) when RF signals are routed also to the beamforming submodules (211) via the low-loss interposer. Distributing RF signals both to satellite ICs (22) and beamforming submodules (211) via the low-loss interposer is preferable, because this way routing to the beamforming submodules (211) and to satellite IC(s) (22) can be designed to have mutually similar signal propagation characteristics, which simplifies RF-design. For enabling such external distribution of all RF signals to all beamforming elements, whether implemented as separate satellite ICs (22) or integrated beamforming submodules (211), the master IC (21) comprises further RF inputs for enabling the beamforming submodules (211) to receive RF signals from the distribution network on the interposer or further RF outputs for enabling the beamforming submodules (211) to transmit RF signals to the distribution network on the interposer. Preferably, said further RF inputs/output are implemented in the beamforming submodules (211) of the master IC. Each satellite IC (22) performs phase shifting for beamforming and serves a plurality of antenna elements (10).

Figure 3:
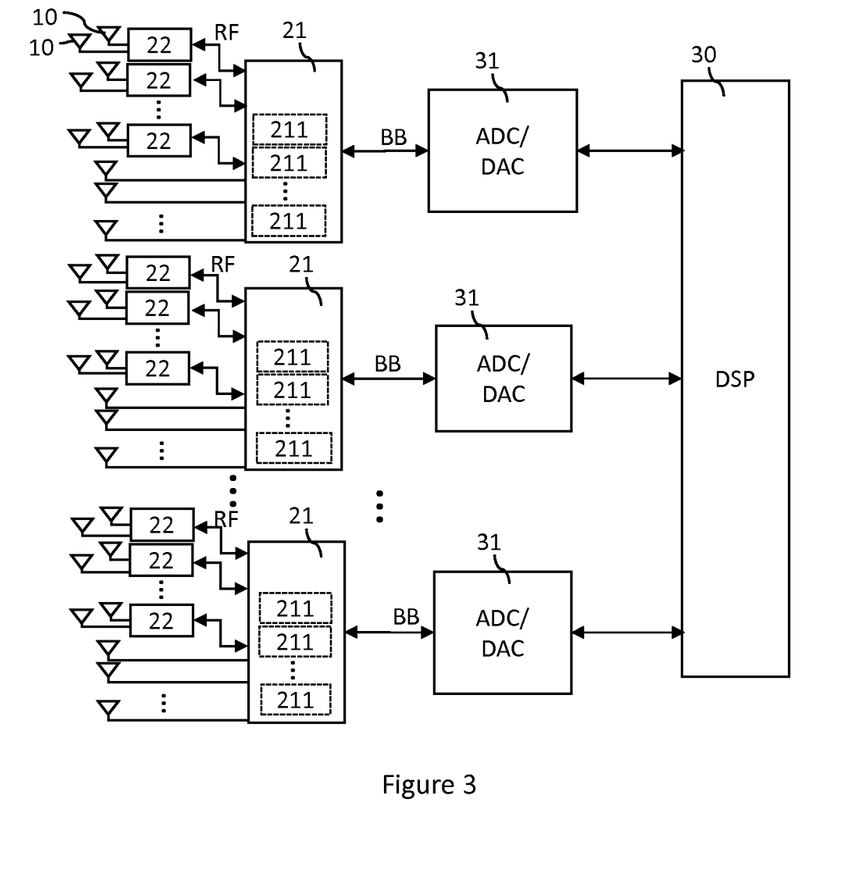
FIG. 3 illustrates a second embodiment of an architecture for feeding a phased antenna array.

The FIG. 3 illustrates a modular architecture for serving a phased antenna array according to another embodiment of the invention. The same architectural principle is applicable to both transmission and reception operation, in this case applicable also to a direct conversion receiver/transmitter that does not apply IF.

As understood by a skilled person, in transmission operation the signals proceed from digital signal processing by the DSP (30) on the right from BB to RF signals to be transmitted by the antenna elements (10) on the left, while in reception operation, RF signals received by the antenna elements (10) on the left are processed and transported via the functional elements in the direction from the RF domain BB domain and finally to digital signal processing by the DSP (30) on the right.

As usual, one or more DSPs (30) perform digital signal processing and the digital signal is converted into an analog baseband signal by a plurality of DACs (31) or the arriving analog baseband signal is converted into a digital signal for the DSP (30) by a plurality of ADCs (31). Alternatively, a single DAC (31) or ADC (31) may be used.

Each master IC (21) and satellite ICs (22) coupled to it form one module of the modular architecture. BB signals can be distributed over a lossy distribution media such as standard printed circuit board, while RF signals between the master IC (21) and the satellite ICs (22) are preferably distributed over a low-loss media, which may be implemented for example by a low-RF-loss interposer. Since few signals need to be distributed over the lossy distribution media, routing is easy. No problematic RF signals need to be routed on the lossy distribution media. The modular structure further enables keeping number of RF distribution connections relatively low, while also length of the RF distribution connections can be maintained short.

BB to RF conversion for transmission and/or RF to BB conversion for reception are performed by the plurality of master ICs (21). Each master IC (21) comprises a plurality of beamforming submodules (211), which perform phase shifting for beamforming and directly serve a plurality of antenna elements (10). RF signals for the beamforming submodules (211) are distributed over the low-loss interposer or within the master IC (21) itself. Routing of RF signals through the low-loss interposer is preferable, because this way routing to the beamforming submodules (211) and to the satellite IC(s) can be designed to be mutually similar, which simplifies overall RF-design. The master IC (21) preferably comprises a plurality of RF signal outputs and/or inputs, which enable distributing RF-signals between the master IC (21) and a plurality of satellite IC's (22) as well as between the master IC (21) and the beamforming submodules (211), each performing phase shifting for beamforming and serving a plurality of antenna elements (10). Distributing RF signals both to satellite ICs (22) and beamforming submodules (211) via the low-loss interposer is preferable, because this way routing to the beamforming submodules (211) and to satellite IC(s) (22) can be designed to have mutually similar signal propagation characteristics, which simplifies RF-design. For enabling such external distribution of all RF signals to all beamforming elements, whether implemented as separate satellite ICs (22) or integrated beamforming submodules (211), the master IC (21) comprises further RF inputs for enabling the beamforming submodules (211) to receive RF signals from the distribution network on the interposer or further RF outputs for enabling the beamforming submodules (211) to transmit RF signals to the distribution network on the interposer. Preferably, said further RF inputs/output are implemented in the beamforming submodules (211) of the master IC.

At first sight, the modular architecture as explained in the FIGS. 2 and 3 may appear complicated, but when applied into an actual circuitry layout serving antennas arranged in to operate as a phased antenna array, the benefits provided by the novel architecture can be demonstrated, as will be described next.

FIGS. 4a to 4d illustrate schematically a transmitter architecture of a module according to embodiments of the invention. Drawings are not in scale. Distribution of low frequency signals, in other words signals in frequency range that is below RF frequencies are omitted for clarity. Such signals below RF frequencies comprise, for example, ground, operating power as well as intermediate frequency and/or baseband frequency signals as applicable in the respective receiver or transmitter design. Also, a local oscillator signal can be delivered to the master IC as a low frequency signal. In a practical implementation, low frequency signals are preferably distributed by means of a printed circuit board as known in the art.

Figure 4A:
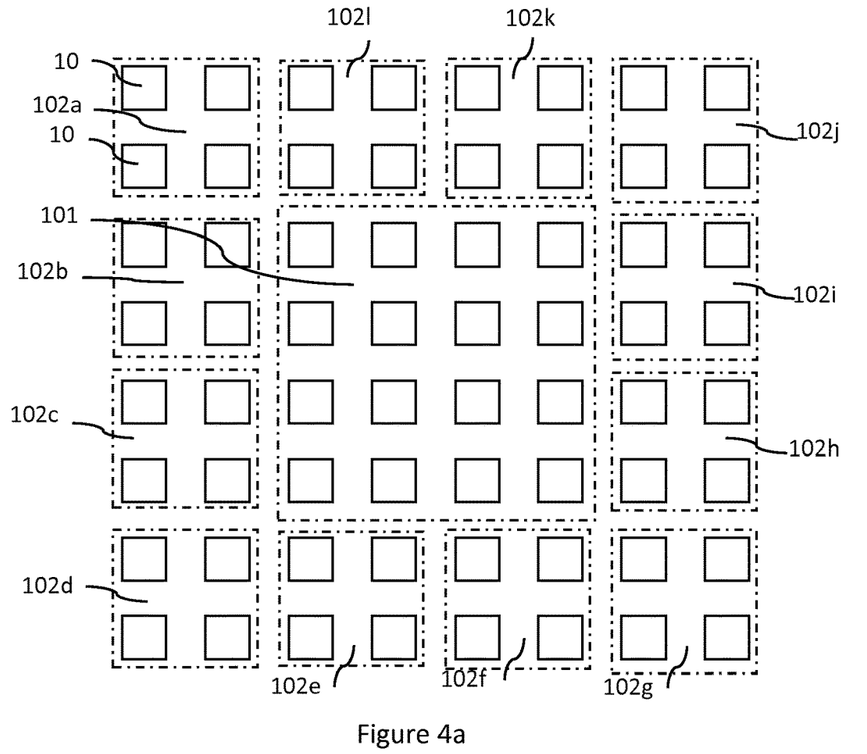
FIGS. 4a to 4d illustrate schematically an implementation of the architecture of a module according to an embodiment.

The FIG. 4a illustrates an array of antenna elements (10) of a module. Size of the antenna elements (10) and distance between the antenna elements (10) depend on the operation frequency range of the antenna array. This example is provided with 8×8=64 antenna elements (10), but the module may also have any other number of antenna elements. For the purpose of illustrating and explaining the invention, antenna elements (10) may be divided into a first portion (101) and a second portion (102) that is further divided into a plurality of sub-portions (102a to 102l) of the second portion (102) of antenna elements. The first portion (101) and sub-portions (102a to 102l) are illustrated in the FIG. 4a with dashed lines.

Figure 4B:
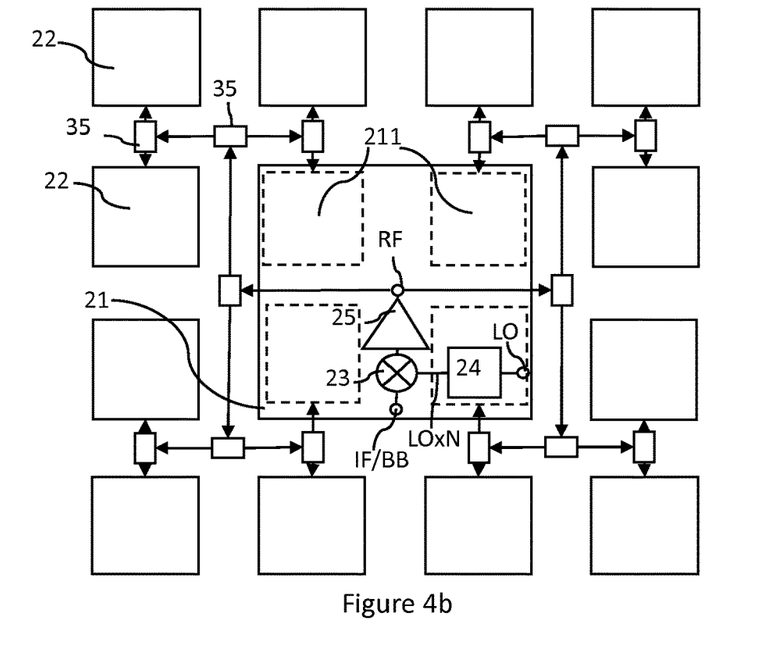

The FIG. 4b illustrates schematically a transmitter architecture of a module according to the embodiments of the invention, configured to feed the antenna array of the FIG. 4a. Only selected key elements are provided in this presentation, which are important for understanding the basic architecture, which is applicable to various transmitter architecture implementations known in the art. A master IC (21) is surrounded by a plurality of satellite ICs (22).

Operation of the master IC (21) is first explained with respect to transmission operation. As already indicated above, invented architecture is equally applicable to reception by changing direction of the signal flows and changing circuitry elements included in the master IC (21) and the satellite ICs (22) for operating these as receiver circuit elements.

The master IC (21) receives low frequency signal, i.e. an IF signal or a BB signal, which is upconverted by means of a mixer circuitry (23) comprised in the master IC. The master IC (21) receives a local oscillator signal (LO) from a separate local oscillator and received local oscillator frequency is multiplied by a multiplier (24) comprised in the master IC (21) into a frequency that is suitable for up-conversion of the FF or BB signal. Preferably, the multiplier (24) multiplies the local oscillator frequency by an integer. The local oscillator frequency is preferably a relatively low frequency oscillator, so that the LO signal can be considered as a low frequency signal, fit to be distributed over a PCB without experiencing significant losses. The master IC (21) also comprises at least one adjustable amplifier (25) for performing automatic gain control (AGC). The master IC (21) may comprise circuitry for IF beamforming. As a result of up-conversion and AGC and optional IF beamforming, the master IC produces an RF signal (RF), which is ready to be distributed towards phase shifting circuitries of the module for beamforming and subsequent transmission by the antenna elements. As understood by a skilled person, the schematic representation of the mixer circuitry (23), multiplier (24) and adjustable amplifier (25) does not illustrate actual location of the respective circuitry within the master IC (21), but are merely intended to illustrate that these functionalities are comprised in the master IC circuitry. Furthermore, the master IC circuitry may comprise further circuit elements, including but not limited to filters, amplifiers and/or phase shifting components.

The master IC (21) comprises a plurality of beamforming submodules (211), each configured to perform phase shifting for beamforming and to feed part of the first portion of antenna elements (101). As a result, the beamforming submodules (211) of the master IC (21) feed the first portion of antenna elements (101) with phase-shifted RF signals for beamforming. Preferably, the beamforming submodules (211) are like each other, each configured to feed the same number of antenna elements (10).

The module further comprises a plurality of satellite ICs (22), each configured to perform phase shifting for beamforming and to feed one of the sub-portions (102a to 102l) of the second portion of antenna elements. Together, the satellite ICs (22) feed the second portion (102) of antenna elements (10). Thus, the beamforming submodules (211) of the master IC (21) and the satellite ICs (22) together feed all antenna elements (10) of the module. Preferably, satellite IC (22) are like each other, each configured to feed the same number of antenna elements (10). Preferably, the number of antenna elements (10) fed by a satellite IC (22) is equal to the number of antenna elements fed by one of the beamforming submodules (211). This way, circuitry design of the satellite ICs (22) and the beamforming submodules (211) may be largely re-used, since the signal processing operations they are configured to perform are largely similar.

The RF signal (RF) is distributed to the beamforming submodules (211) and to the satellite ICs (22) utilizing any conventional RF signal power distribution means.

According to a preferred embodiment, the RF signal (RF) is distributed to the beamforming submodules (211) and to satellite ICs (22) via one or more output RF signals of the master IC (21). Preferably, the RF signals (RF) are distributed over a low-loss connection, which may be implemented for example by a low-loss interposer. RF power division may be implemented by the master IC (21) and/or using reactive RF signal splitters/combiners (35), such as Wilkinson power dividers, along the RF signal distribution network between the master IC (21) and satellite ICs (22) and beamforming submodules (211). As known in the art, reactive RF signal splitters/combiners are applicable both as power splitters for transmission operation and as power combiners for signal reception operation. Thus, basically similar design of a distribution network can be used for transmitter and receiver operations. When the RF signal is distributed in its entirety over the low-loss interposer, the master IC comprises RF inputs for the beamforming submodules to receive their respective portions of the RF signal to be transmitted.

Each of the plurality of satellite ICs (22) is configured to receive a portion of the RF signal from the master IC (21), to perform phase shifting to the received portion of the RF signal for beamforming and to feed the phase-shifted portion of the RF signal to the respective antenna elements (10) comprised in a respective sub-portion (102a to 102l) of the second portion of antenna elements.

In an alternative embodiment, a first portion of the RF signal is distributed to the submodules (211) on the master IC (21) itself, while a second portion of the RF signal is distributed to the satellite ICs (22) over the low-loss interposer. This alternative further reduces required signal paths on the low-loss interposer, but effects of different signal distribution routes on the RF signals need to be taken in account in the circuitry design of the satellite ICs and beamforming submodules.

Figure 4C:
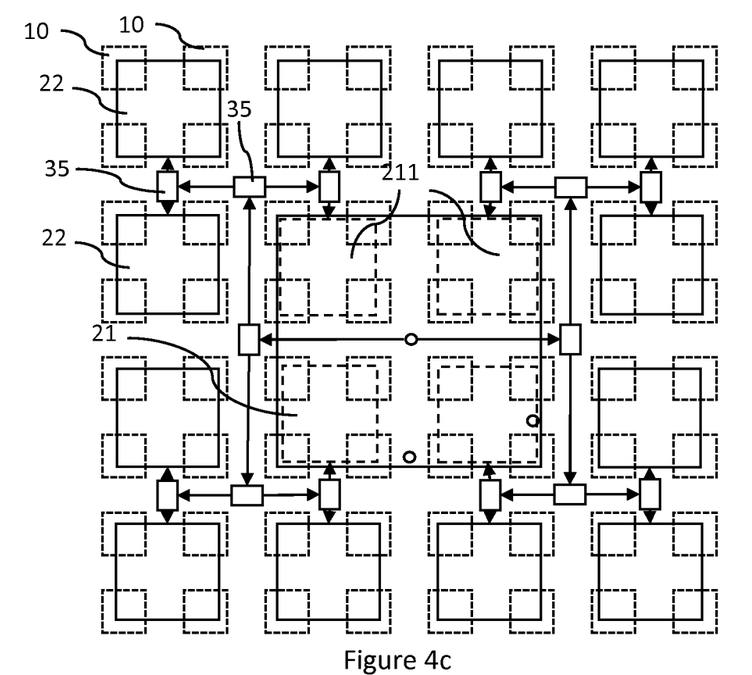

FIG. 4c illustrates schematically mutual lateral positions of functional elements of a module according to the embodiments of the invention, combining the antenna elements (10) shown in the FIG. 4a and the circuitries (ICs) and RF signal distribution shown in the FIG. 4b. Antenna elements (10) fed by the master IC (21) and each satellite IC (22) are preferably disposed laterally in the vicinity of the respective beamforming submodules (211) and satellite ICs (22) for enabling short RF connections towards the antennas. Symmetrical placement of the satellite ICs (22) with respect to the master IC (21) enable having approximately equally long connections between the master IC and each of the satellite ICs (22) and the beamforming submodules (211), which simplifies the RF design by causing approximately equal delays, losses and phase changes in all RF distribution connections. Likewise, beamforming submodules (211) of the master IC (21) are preferably disposed approximately symmetrically to each other, and aligned in the array with respect to the satellite ICs (22) and antenna elements so that together, the beamforming submodules (211) and the satellite ICs (22) form an approximately symmetrical array or grid. Thus, distribution networks of RF signals to both the satellite ICs (22) and the beamforming submodules (211) can be made approximately equally long, further facilitating ease of RF design by making it well repeatable.

Figure 4D:
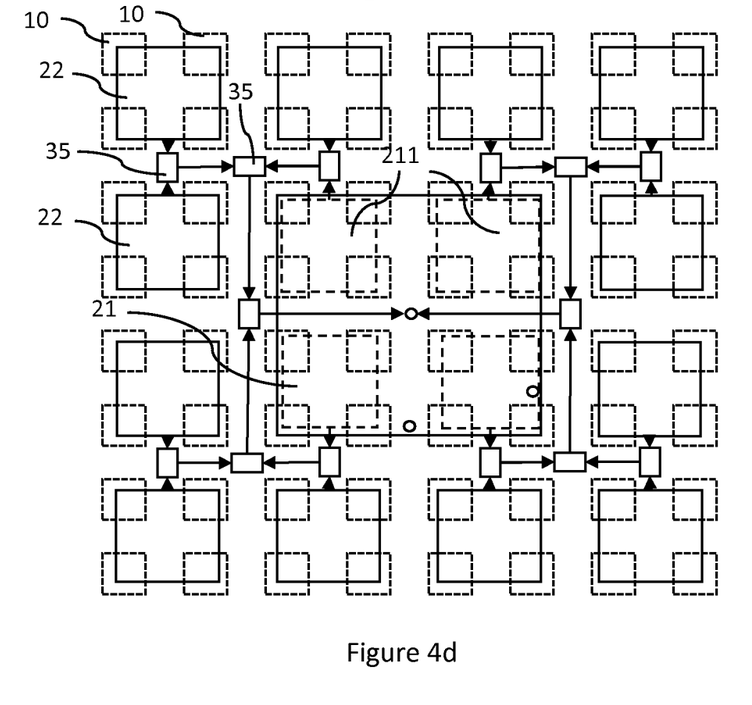

FIG. 4d illustrates the same modular architecture when applied to a receiver operation, where each antenna element (10) of the array receives a portion of the RF signal. Satellite ICs (22) receive RF signals from the second portion (102) of antenna elements and perform phase shifting before each satellite IC (22) provides a part of the respective portion of the RF signal towards the master IC's (21) RF signal inputs via the distribution network, which is preferably provided over a low-loss connection such as a low-loss interposer. The distribution network combines different portions of the received RF signal arriving from the satellite ICs. Antenna elements (10) of the first portion of antenna elements (101) also receive portion of the RF signal and the beamforming submodules (211) perform phase shifting respectively. When the RF signal is distributed in its entirety over the low-loss interposer, the master IC (21) comprises RF outputs for the beamforming submodules for providing their respective portions of the RF signal towards the master IC (21) via the RF distribution network similar to the portion of the RF signal received from the satellite ICs (22). The distribution network preferably combines at least partially all portions of the RF signal before it arrives at the at least one RF signal input of the master IC (21). If not combined already in the distribution network, the master IC combines all received portions of the RF signal received from satellite ICs (22) and from beamforming submodules (211) into a single, combined RF signal and performs down conversion of the signal into a low frequency using a down conversion device such as a mixer. As known in the art, ICs that receive RF signals from antennas and/or from other ICs further comprise receiver circuitry such as one or more amplifiers, such as low noise amplifiers (LNA), and filters. The master IC may also be configured to perform IF beamforming. Since the architecture according to the invention is not dependent on details of the receiver architecture, only part of the receiver architecture that are specific to the invented modular architecture are shown in the FIG. 4d. After at least down conversion, the master IC provides a low frequency signal, i.e. an IF or BB signal, at its output. If the low frequency signal is an IF signal, it is further down converted into a BB signal before digitizing the signal by an ADC for a DSP. When the master IC produces a BB signal, it is ready to be digitized for the DSP.

FIGS. 4a to 4d illustrate approximate relative lateral areas occupied by antenna elements (10), master IC (21) and satellite ICs (22) of an E-band transmitter or receiver module. As known in the art, E-band refers to radio frequencies in a frequency range between 60 GHz to 90 GHZ. At E-band, typical distance between adjacent antenna elements (10) is about 1 mm. In practice, all needed functionalities of the master IC (21) can be implemented on an IC with lateral dimensions of approximately 4×4 mm, while the lateral dimensions of satellite ICs (22) are about 1.5×1.5 mm. Thus, dimensions of the IC's fit nicely in the grid of antenna elements when each satellite IC (22) serves four antenna elements (10) and the master IC (21) feeds 16 antenna elements (10), while each beamforming submodule serves 4 antenna elements.

Figure 5:
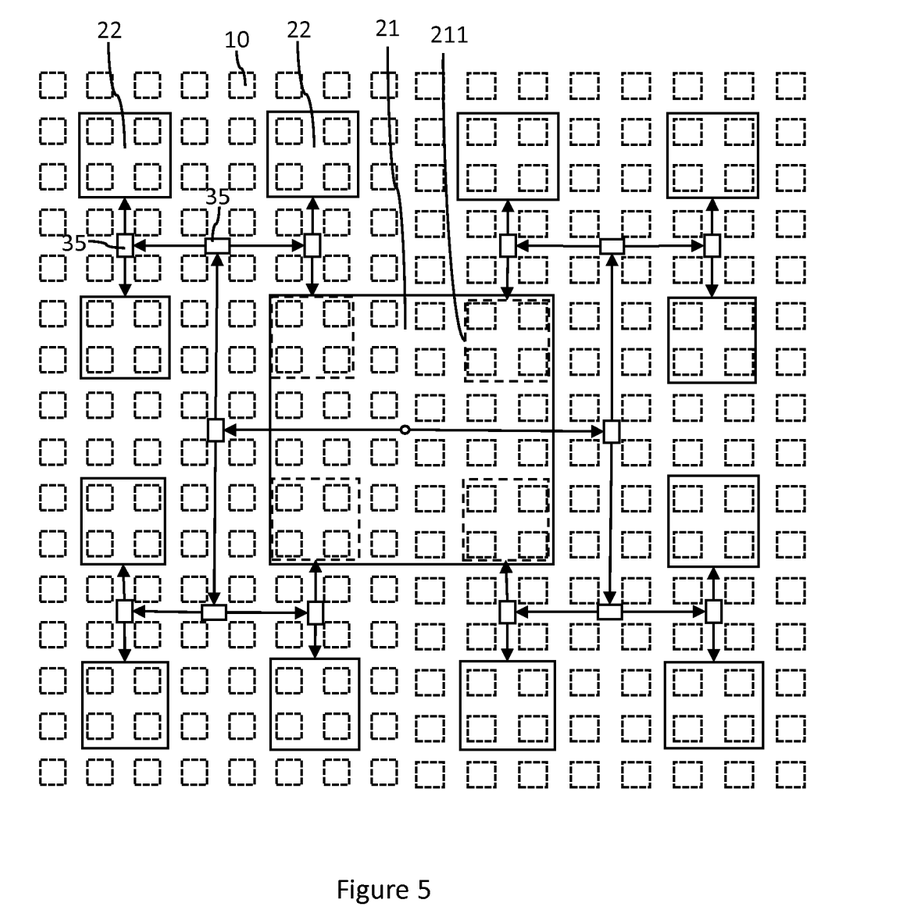
FIG. 5 illustrates schematically an implementation of the architecture of a module according to another embodiment.

The FIG. 5 illustrates schematically lateral positions of functional elements of another module according to the embodiments of the invention. The figure is not in scale. In this module, the master IC (21) feeds the first portion of antenna elements (10) that comprises 8×8=64 antenna elements, each beamforming submodule of the master IC (21) feeds 4×4=16 antenna elements, and each satellite IC (22) feeds a sub-portion of the second portion of antenna elements that comprises 4×4=16 antenna elements (10). Similar symmetrical design of modules and RF signal distribution can be implemented also with this module as with that of FIGS. 4a to 4d, and also this embodiment can be altered into a receiver module by transversion of signal directions and changing the functionalities of the master IC (21) and the satellite ICs (22) suitable for a receiver using the same IC functionality principles as explained in connection to the FIG. 4d.

Figure 6:
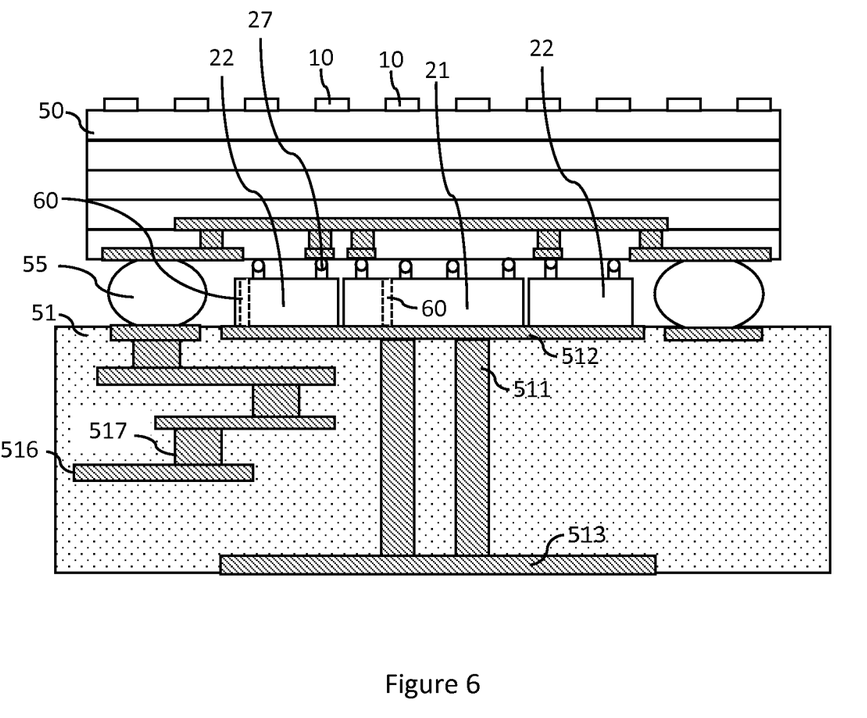
FIG. 6 illustrates a cross-section of a module implementation.

The FIG. 6 illustrates a cross-section of a structure of an exemplary implementation of a module installed on a PCB (51). The drawing is not in scale and only shows details needed for enabling understanding some basic design principles. Metal connections on the PCB (51) and on the low-loss interposer (50) are illustrated with diagonally patterned areas. In this example, antenna elements (10) are implemented as patch antennas on top of the low-loss interposer (50), which is typically a multi-layered structure. The master IC (21) and satellite ICs (22) are disposed between the low-loss interposer (50) and the PCB (51), which is also typically a multi-layered structure. Horizontal metal connections (516) are embedded within the PCB (51) and within the low-loss interposer (50) and electrically connected to each other with vertical vias (517). The master IC (21) and satellite ICs (22) are attached on the top face of the PCB (51). Thermal coupling for the ICs (21, 22) can be implemented for example by metallized vias (511) traversing between metallized areas (512, 513) on the top face of the PCB, where the ICs (21, 22) are attached, and on the bottom face of the PCB. The metallized area (513) on the bottom face of the PCB (51) may be further attached to a heatsink (not shown) to improve heat dissipation. Signal connections (27) of the master IC (21) and the satellite ICs are provided on the top face of the ICs, facing towards and thus available for coupling to the low-loss interposer (50). These signal connections (27) preferably comprise all connections that carry radio frequency signals. Off-chip routing of RF signals (not shown) between the master IC (21), satellite ICs (22) and antenna elements (10) is implemented on the low-loss interposer (50). A plurality of solder balls (55) couple low frequency signals, comprising for example BB and/or IF signals, DC voltages like ground, operating power and/or reference voltages, LO signal etc., between the PCB (51) and the interposer (51), while the solder balls (55) also provide mechanical support for the interposer, maintaining a wanted distance between the PCB (51) and the interposer (50) to fit the ICs in between these. All low frequency signals are preferably distributed by the PCB (51). According to some embodiments, one or more through silicon vias (60) may be provided in the master IC (21) or in one or more of the satellite ICs (22) for connecting BB and/or IF signals, LO signal and DC voltages.

Figure 7:
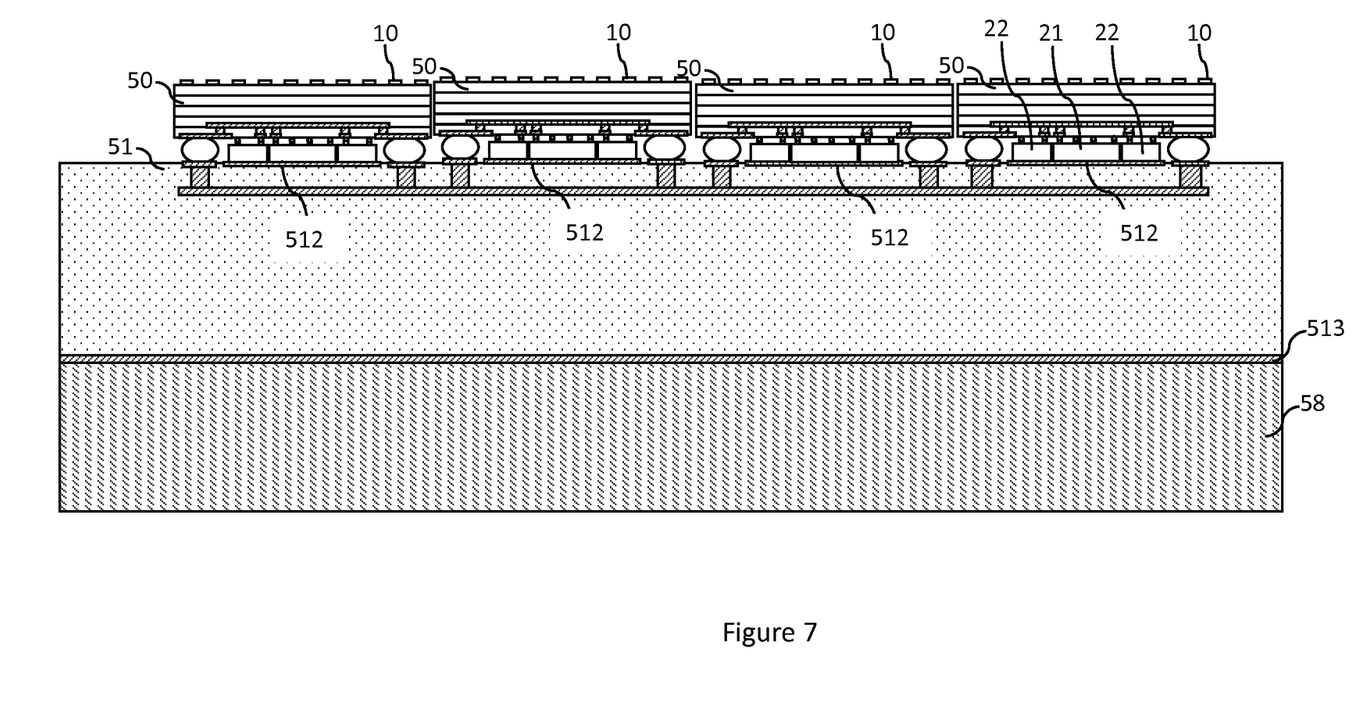
FIG. 7 illustrates a cross-section of a phased antenna array served by a plurality of modules.

FIG. 7 illustrates cross section of a phased array antenna implemented with a plurality of modules according to the invention. The drawing is not in scale. Four modules, similar to that illustrated in the FIG. 6, are shown in this cross-section, disposed on the same PCB (51). A heat sink (58) is attached on the face of the PCB (51) that is opposite to the face on which modules are installed. Vias between the metallic areas (512, 513) for facilitating heat transfer through the PCB (51) are not shown.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A modular beamforming architecture for transmitting signals via a phased antenna array, the phased antenna array comprising a plurality of antenna elements that is grouped into a first portion of antenna elements and a second portion of antenna elements, wherein the modular beamforming architecture is based on a beamforming module comprising:
   a master integrated circuit, IC, configured to receive a low frequency signal, wherein the low frequency signal is any one of an intermediate frequency signal (IF) and a baseband signal (BB), the master IC comprising:
      a frequency conversion module configured to upconvert the low frequency signal into a radio frequency, RF, signal comprising a first portion of the RF signal and a second portion of the RF signal;
      a plurality of beamforming submodules configured to perform phase shifting for the first portion of the RF signal for beamforming and to directly feed the phase shifted first portion of the RF signal to the first portion of antenna elements;
      at least one RF signal output configured to output the RF signal or the second portion of the RF signal; and
      wherein, when the at least one RF signal output is configured to output the RF signal, further comprising a plurality of RF inputs for receiving the first portion of the output RF signal;
   and
   a plurality of satellite ICs configured to feed the second portion of the antenna elements, wherein each of the plurality of satellite ICs is configured to receive a part of the RF signal or a part of the second portion of the RF signal provided by the at least one RF signal output of the master IC, to perform phase shifting to the received part of the RF signal or the second portion of the RF signal for beamforming, and to feed a subset of the second portion of antenna elements.

2. The modular beamforming architecture according to claim 1, wherein each of the beamforming submodules of the master IC is configured to feed a number of antenna elements among the first portion of antenna elements that is equal to a number of antenna elements of the subset of the second portion of antenna elements fed by one of the satellite ICs.

3. The modular beamforming architecture according to claim 1, wherein the master IC is configured to receive a local oscillator signal and the master IC comprises a multiplier that multiplies the local oscillator signal by an integer, and wherein the frequency conversion module is configured to upconvert the low frequency signal into the RF signal using said multiplied local oscillator signal.

4. The modular beamforming architecture according to claim 1, wherein the second portion of the RF signal is divided into a plurality of parts by at least one of the master IC and a plurality of power splitters along a signal distribution path between the master IC and satellite ICs, wherein each part of the second portion of the RF signal is fed into one of the plurality of satellite ICs, or
   wherein the RF signal is divided into a plurality of parts by at least one of the master IC and a plurality of power splitters along a signal distribution path between the master IC and satellite ICs, wherein each part of the RF signal is fed into one of the plurality of satellite ICs or into one of the beamforming submodules.

5. The modular beamforming architecture according to claim 1, wherein the RF signal is distributed to the satellite ICs and to the beamforming submodules via a low-loss interposer, or
   wherein the first portion of the RF signal is distributed to the beamforming submodules within the master IC and the second portion of the RF signal is distributed to the satellite ICs via a low-loss interposer, and/or
   wherein the low frequency signal is distributed to the master IC via a printed circuit board (PCB).

6. A modular beamforming architecture for receiving signals via a phased antenna array, the phased antenna array comprising a plurality of antenna elements grouped into a first portion of antenna elements and a second portion of antenna elements, wherein the modular beamforming architecture is based on a beamforming module comprising:
   a master integrated circuit, IC, configured to produce a low frequency signal based on a received radio frequency, RF, signal comprising a first portion of the RF signal and a second portion of the RF signal, wherein the low frequency signal is any one of an intermediate signal and a baseband signal, the master IC comprising:
      a plurality of beamforming submodules configured to perform phase shifting for beamforming for the first portion of the RF signal received directly from the first portion of antenna elements, for obtaining the phase shifted first portion of the RF signal;
      at least one RF signal input configured to receive the phase-shifted second portion of the RF signal or the RF signal or a phase-shifted RF signal and a phase-shifted second portion of the RF signal;
      when the at least one RF signal input is configured to receive the phase-shifted RF signal, further comprising a plurality of RF outputs for outputting the phase-shifted first portion of the RF signal received by the plurality of beamforming submodules; and
      a frequency conversion module configured to down convert the phase-shifted RF signal into the low frequency signal;
   and
   a plurality of satellite ICs configured to perform phase shifting for beamforming to the second portion of the RF signal received by the second portion of antenna elements, wherein each of the plurality of satellite ICs is configured to receive a part of the second portion of the RF signal that is received by a subset of the second portion of antenna elements, to perform phase shifting for beam forming to the respective part of the second portion of the RF signal to produce a respective part of the phase-shifted second portion of the RF signal, and to feed the respective part of the phase-shifted second portion of the RF signal towards one of the at least one RF signal input of the master IC.

7. The modular beamforming architecture according to claim 6, wherein each of the beamforming submodules of the master IC is configured to serve a number of antenna elements among the first portion of antenna elements that is equal to a number of antenna elements of the subset of the second portion of antenna elements served by one of the satellite ICs.

8. The modular beamforming architecture according to claim 6, wherein the master IC is configured to receive a local oscillator signal and the master IC comprises a multiplier that multiplies the local oscillator signal by an integer, and wherein the frequency conversion module is configured to down-convert the RF signal into the low frequency signal using said multiplied local oscillator signal.

9. The modular beamforming architecture according to claim 6, wherein a plurality of parts of the second portion of the RF signal is combined into the second portion of the RF signal by at least one of the master IC and a plurality of power combiners along a signal distribution path between satellite ICs and the master IC, or wherein the plurality of parts of the RF signal is combined into the RF signal by at least one of the master IC and a plurality of power combiners along a signal distribution path between satellite ICs and the plurality of beamforming submodules and the master IC, wherein each part of the RF signal is provided by one of the plurality of satellite ICs or by one of the beamforming submodules.

10. The modular beamforming architecture according to claim 6, wherein the RF signal is distributed from the satellite ICs and from the beamforming submodules via a low-loss interposer, or
wherein the first portion of the RF signal is distributed from the beamforming submodules within the master IC and the second portion of the RF signal is distributed from the satellite ICs via a low-loss interposer, and/or
wherein the low frequency signal is distributed to the master IC via a printed circuit board (PCB).

11. A method for transmitting signals via a phased antenna array using a modular beamforming architecture, the phased antenna array comprising a plurality of antenna elements that is grouped into a first portion of antenna elements and a second portion of antenna elements, wherein the modular beamforming architecture is based on a beamforming module comprising a master IC and a plurality of satellite ICs, wherein the master IC:
receives a low frequency signal, wherein the low frequency signal is any one of an intermediate frequency signal and a baseband signal;
upconverts the low frequency signal into a radio frequency, RF, signal comprising a first portion of the RF signal and a second portion of the RF signal;
performs, by a plurality of beamforming submodules, phase shifting for the first portion of the RF signal for beamforming, and feeds the phase shifted first portion of the RF signal directly to the first portion of antenna elements; and
outputs the RF signal or the second portion of the RF signal; and
wherein, when master IC outputs the RF signal, the master IC receives, by a plurality of RF inputs, the first portion of the output RF signal for said beamforming submodules;
and wherein the plurality of satellite ICs:
feeds the second portion of the antenna elements, wherein each of the plurality of satellite ICs:
receives a part of the RF signal or a part of the second portion of the RF signal output by the master IC;
performs phase shifting to the received part of the RF signal or the second portion of the RF signal for beamforming; and
feeds a subset of the second portion of antenna elements.

12. A method for receiving signals via a phased antenna array using a modular beamforming architecture, the phased antenna array comprising a plurality of antenna elements grouped into a first portion of antenna elements and a second portion of antenna elements, wherein the modular beamforming architecture is based on a beamforming module comprising a master IC and a plurality of satellite ICs, wherein the master IC:
produces a low frequency signal based on a received radio frequency, RF, signal comprising a first portion of the RF signal and a second portion of the RF signal, wherein the low frequency signal is any one of an intermediate frequency, IF, signal and a baseband, BB, signal;
performs, by a plurality of beamforming submodules, phase shifting for beamforming for the first portion of the RF signal received directly the first portion of antenna elements for producing the phase-shifted first portion of the RF signal;
receives a phase-shifted second portion of the RF signal or a phase-shifted RF signal comprising a phase-shifted first portion of the RF signal and a phase-shifted second portion of the RF signal;
wherein, when the master IC receives the phase-shifted RF signal, the master IC outputs, by a plurality of RF outputs the phase-shifted first portion of the RF signal from said beamforming submodules; and
down converts the phase-shifted RF signal to produce the low frequency signal; and the plurality of satellite ICs:
perform phase shifting for beamforming to the second portion of the RF signal received by the second portion of antenna elements, wherein each of the plurality of satellite ICs:
receives a part of the second portion of the RF signal that is received by a subset of the second portion of antenna elements;
performs phase shifting for beam forming to the respective part of the second portion of the RF signal to produce the phase-shifted second portion of the RF signal; and
feeds the respective part of the phase-shifted second portion of the RF signal towards one of the at least one RF signal input of the master IC.

13. The modular beamforming architecture according to claim 2, wherein the master IC is configured to receive a local oscillator signal and the master IC comprises a multiplier that multiplies the local oscillator signal by an integer, and wherein the frequency conversion module is configured to upconvert the low frequency signal into the RF signal using said multiplied local oscillator signal.

14. The modular beamforming architecture according to claim 7, wherein the master IC is configured to receive a local oscillator signal and the master IC comprises a multiplier that multiplies the local oscillator signal by an integer, and wherein the frequency conversion module is configured to down-convert the RF signal into the low frequency signal using said multiplied local oscillator signal.

15. The modular beamforming architecture according to claim 4,
- wherein the RF signal is distributed to the satellite ICs and to the beamforming submodules via a low-loss interposer, or
- wherein the first portion of the RF signal is distributed to the beamforming submodules within the master IC and the second portion of the RF signal is distributed to the satellite ICs via a low-loss interposer, and/or
- wherein the low frequency signal is distributed to the master IC via a printed circuit board (PCB).

* * * * *